United States Patent [19]

Metcalfe

[11] Patent Number: 4,604,780
[45] Date of Patent: Aug. 12, 1986

[54] METHOD OF FABRICATING A COMPONENT HAVING INTERNAL COOLING PASSAGES

[75] Inventor: Arthur G. Metcalfe, National City, Calif.

[73] Assignee: Solar Turbines Incorporated, San Diego, Calif.

[21] Appl. No.: 463,597

[22] Filed: Feb. 3, 1983

[51] Int. Cl.[4] .......................... B21K 3/04; B23P 15/04
[52] U.S. Cl. .......................... 29/156.8 R; 29/156.8 B;
    29/156.8 H; 29/423; 29/455 R; 29/DIG. 4;
    29/DIG. 16; 228/159; 228/193; 228/243;
    415/115; 416/96 A; 416/99 R
[58] Field of Search .................... 29/156.8 R, 156.8 B,
    29/156.8 H, 423, 455, DIG. 4, DIG. 16;
    228/159, 193, 243; 415/115; 416/96 R, 96 A, 97
    R; 156/656

[56] References Cited

U.S. PATENT DOCUMENTS

| | | | |
|---|---|---|---|
| 2,641,439 | 6/1953 | Williams | 29/156.8 B X |
| 2,965,955 | 12/1960 | Horne | 29/156.8 R |
| 2,986,806 | 6/1961 | Hignett et al. | 29/423 X |
| 2,999,303 | 9/1961 | Eccles | 29/156.8 H |
| 3,014,269 | 12/1961 | Graham et al. | 29/156.8 H |
| 3,014,270 | 12/1961 | Eccles | 29/156.8 H |
| 3,026,605 | 3/1962 | Turner | 29/156.8 R |
| 3,045,328 | 7/1962 | Turner et al. | 29/156.8 H |
| 3,107,416 | 10/1963 | Horne | 29/156.8 R |
| 3,230,613 | 1/1966 | Rechin et al. | 29/423 X |
| 3,566,493 | 3/1971 | Poucher et al. | 29/455 X |
| 3,635,587 | 1/1972 | Giesman et al. | 29/156.8 H |
| 3,653,110 | 4/1972 | King, Jr. et al. | 29/156.8 H |
| 3,825,984 | 7/1974 | Linko et al. | 29/156.8 R |
| 4,042,162 | 8/1977 | Meginnis et al. | 228/193 |
| 4,283,822 | 8/1981 | Muth et al. | 29/156.8 H |
| 4,395,303 | 7/1983 | Weir | 228/193 X |

FOREIGN PATENT DOCUMENTS

| | | | |
|---|---|---|---|
| 18197 | 8/1969 | Japan | 29/423 |
| 820939 | 9/1959 | United Kingdom | 29/156.8 B |
| 833261 | 4/1960 | United Kingdom | 29/156.8 B |
| 842114 | 7/1960 | United Kingdom | 29/156.8 B |

*Primary Examiner*—Mark Rosenbaum
*Assistant Examiner*—Ronald S. Wallace
*Attorney, Agent, or Firm*—Hughes & Cassidy

[57] ABSTRACT

Methods for manufacturing components having internal flow passages in which an insert composed of a carrier and passage-forming and/or flow controlling elements is sandwiched between or installed in elements of the component. The insert associated and component elements are then bonded together and the carrier subsequently leached away to complete the formation of the flow passages.

3 Claims, 4 Drawing Figures

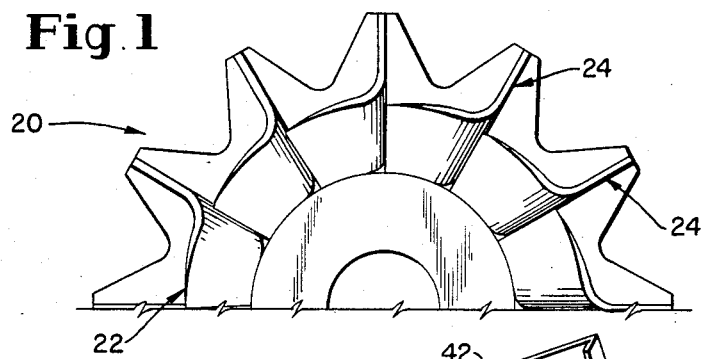
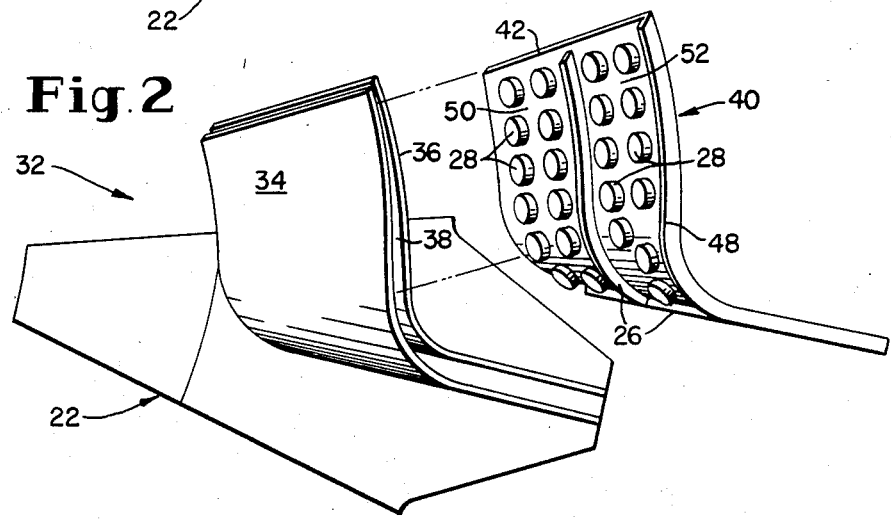
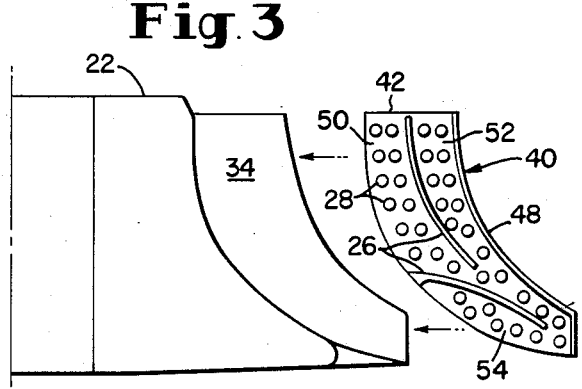
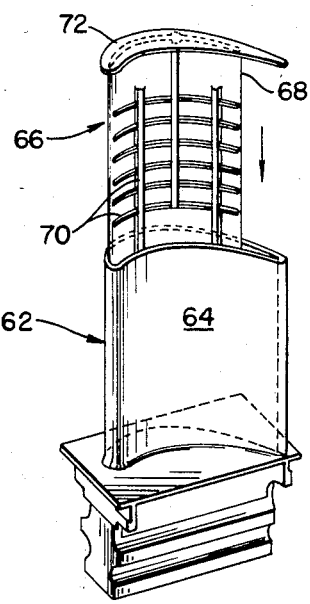

METHOD OF FABRICATING A COMPONENT HAVING INTERNAL COOLING PASSAGES

TECHNICAL FIELD OF THE INVENTION

The present invention relates to novel, improved methods for manufacturing components having one or more internal passages through which a heat exchange fluid can be circulated to alter the temperature of the component.

The principles of the present invention are particularly useful in the manufacture of radial turbine wheels and in the manufacture of blades and nozzles for axial turbines and will accordingly be developed primarily with respect to those applications. It is to be understood, however, that this is being done for the sake of convenience and clarity and is not intended to limit the scope of the invention as defined in the appended claims.

BACKGROUND OF THE INVENTION

Axial turbine wheel blades and nozzles typically have internal passages through which a fluid such as compressor discharge air can be circulated to cool the component. This allows hotter turbine inlet temperatures to be employed, increasing the efficiency of the turbine in which the components are installed.

For the same reason, considerable interest has been expressed in internally cooled wheels for radial engines.

However, components such as those axial turbine parts identified above are currently made by casting the metal around a ceramic core and then leaching the ceramic from the interior of the casting with caustic soda.

This approach is entirely unsuitable for radial turbine wheels because the blades of such wheels tend to be long and thin and to have a high degree of curvature. Consequently, a ceramic core cannot be positioned with sufficient accuracy to permit casting. Furthermore, in the case of cooled wheels, the core would have to contain holes or perforations into which metal could flow to form pins and partitions in the component; and these would weaken the core to an unacceptable extent. Consequently, internally cooled radial turbine wheels of optimum design have not heretofore been available.

DISCLOSURE OF THE INVENTION

Now, however, it has been discovered that radial turbine wheels with optimal internal cooling can readily be fabricated. This is accomplished by so casting the wheel that each blade is composed of two segments that are integral with the hub of the wheel but are spaced apart.

Next, there is inserted into the resulting open gap a matrix composed of a carrier fabricated of a metal such as iron. This carrier has cutouts filled with members that are fabricated of a superalloy compatible with the superalloy used in the cast wheels (such superalloys are resistant to etching solutions). These members are configured to form internal parts of the radial wheel blades such as turbulence inducing pin fins, flow passage defining partitions, and edge seals between the spaced apart segments of the blades.

The foregoing members are then bonded to the blade segments using hot isostatic pressing or alpha delta tooling, for example; and the carrier part of the matrix is removed with an acid leach. Minor machining will typically complete the manufacturing process.

The novel manufacturing process just described can also be used in fabricating components such as axial flow turbine blades and nozzles. In this case the component is cast with a hollow interior and an open end, and the matrix is inserted into the component through that end (the matrix will in this case include an inset configured to close the open end of the component).

One important advantage of the novel process just described is that the casting of the component being manufactured can be performed with ceramic cores that are simple and monolithic and can consequently be securely anchored and accurately positioned in the casing investment, affording dimensional accuracy. Other advantages of the process are that it allows design flexibility, reduces lead time, eliminates highly stressed joints, and has the potential for reducing tool and processing coats. Also, cooling passages that extend over the entire length of the blade can be made; and there are not joints on aerodynamic surfaces.

OBJECTS OF THE INVENTION

From the foregoing it will be apparent to the reader that the primary object of the invention resides in the provision of novel, improved methods for fabricating components having internal flow passages therein.

Other more specific but nevertheless important advantages of the invention reside in the provision of methods in accord with the preceding object:

which can be used to fabricate components that cannot be made by currently available manufacturing techniques;

which simplify the manufacturing process, reduce lead time, and have the potential for reducing costs;

which allow components to be made with tight internal tolerances;

which afford a high degree of design flexibility;

which can be employed to manufacture components that are free from highly stressed joints.

Other important objects and features and additional advantages of the invention will be apparent from the foregoing and the appended claims and from the ensuing detailed description and discussion of the invention taken in conjunction with the accompanying drawings.

BRIEF DESCRIPTION OF THE DRAWINGS

FIG. 1 is a partial plan view of a radial turbine wheel manufactured in accord with the principles of the present invention;

FIG. 2 shows pictorially one step in the manufacture of the turbine wheel;

FIG. 3 is a partial top view of the turbine wheel showing the manufacturing step referred to in the foregoing description of FIG. 2; and FIG. 4 illustrates, again pictorially, the manufacture of an axial turbine blade in accord with the principles of the present invention.

PREFERRED EMBODIMENTS OF THE INVENTION

Referring now to the drawing, FIG. 1 depicts a radial turbine wheel or rotor 20 constructed by a process embodying the principles of the present invention. Wheel 20, which is of conventional configuration, includes a hub 22 surrounded by a series of integral, curved blades 24. Each of the blades 24 has a series of internal cooling passages defined by internal partitions 26 (see FIG. 3) and a series of internal pin fins 28 which introduce turbulence into air flowing through blades 24 to increase the rate of heat transfer from the blades 24 to the cooling air.

One exemplary rotor of the character just described and illustrated in FIG. 1 is designed for a primary working fluid flow of 2.24 kg/sec with a 1627° C. maximum inlet temperature and a pressure ratio of 20:1 (inlet pressure of 280 pisa). At a coolant air flow of 0.26 to 0.32 kg/sec, metal temperatures can be limited to a maximum of 816° C.; and an aerodynamic efficiency of 85% can be obtained.

Wheel 20 will typically be fabricated from a superalloy such as Inco 792.

The initial step in the manufacture of wheel 20 is the fabrication of the investment casting 32 shown in fragmentary form in FIG. 2. Hub 22 of the wheel is formed in this step. Each of the blades 24 of the wheel is formed in split fashion as two members 34 and 36 which are integral with hub 22 but separated by a gap 38 equalling the width of cooling air passages subsequently formed in the blade.

This method of fabricating wheel 20 has the decided advantage that only simple ceramic cores are needed to form gaps 38. These can be securely anchored in the casting investment. Also, the problems of structural integrity that would be posed if a more complicated configuration were required is avoided.

After casting 32 is made, inserts 40 (see FIGS. 2 and 3) are installed in gaps 38, which will typically be flared from the hub toward the periphery of the wheel to facilitate installation of the inserts.

Each of the inserts 40 includes a sheet iron core or carrier 42 in which pin fin, partition, and end forming members 26, 28 and 48 fabricated from a superalloy such as INCO 792 or Inconel 625 are installed. These members can be held in place by local swaging of the sheet iron core or by small tack welds.

The faying surfaces of members 26, 28, and 48 are then preferably covered with a liquid interface type braze alloy so that high strength joints can be formed between them and the turbine wheel blade members 34 and 36. Transient liquid phase joining systems that can be employed are TLP (United Technologies) and ADB (General Electric). Foils of the amorphous type such as Allied Chemicals Metlglass can also be used as can the electroless deposited nickel-boron alloys developed by DuPont and Allied Chemical. If necessary, foils can be held in place by micro tacking or by fusion bonding in an inert environment.

Next, the pin fin, partition, and end sealing members of the inserts are bonded to the blade forming members 34 and 36. This may be accomplished by HIP (hot isostatic pressing). HIP equipment (which is used in the aero industry) includes a high pressure autoclave containing a well insulated furnace. The parts (wheel castings with inserts installed) to be HIPed are loaded into the furnace and then heated to temperatures of ca. 2300° F. while the chamber is pressurized with an inert gas such as argon to form high strength metallurgical bonds between the pin fin, partition, and end sealing members and the blade members 34 and 36 between which they are sandwiched.

Because the pressure exerted on the components is isostatic, distortion of the wheel is minimized. Defects in the casting are also healed by the process.

Before HIPing, the iron carrier of the insert will typically be melted down to provide a seal at the edge of the blade. This can advantageously be done by electron beam welding to avoid oxidation and the entrapment of gas in the blade.

HIPing is preferably followed by a diffusion cycle to raise the melting point of the brazing alloy by diffusing away the depressing element or elements in that alloy. Thereafter, the required blade height is generated by machining the wheel, and the sheet iron carrier of the matrix is etched away with dilute nitric acid to leave cooling passages 50, 52, and 54 in the blades. Abrasive flow machining can be employed to finish the internal cavity and to increase the radii at the joints between the blade members and the pin fins, partitions, and end sealing members. This makes the structure more resistant to thermal transients and shocks and completes the wheel manufacturing process.

As indicated above, the process just described can also be used to advantage to manufacture components such as nozzles and blades for axial flow turbines. The manufacture of a blade for an axial flow turbine by this process is illustrated in FIG. 4 to which reference is now made.

The blade casting 62 shown in that Figure has a hollow or split airfoil 64 in which is installed an insert 66 composed of an iron core 68 carrying cooling passage forming ribs 70 and a tip 72 for the blade, all formed from a superalloy such as one of those identified above. After the insert has been welded or otherwise secured in place, the blade is processed as discussed above to bond the inserts and tip to airfoil 64 and to subsequently leach away the core of the matrix, leaving the wanted flow passages therein.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

I claim:

1. A method of fabricating a component having internal passages through which a heat transfer fluid can be circulated to alter the temperature of the component, said method comprising the steps of: installing a unitized insert composed of a carrier fabricated from a first metal and at least one internal passage defining member fabricated from a second metal totally in or between external configuration defining portions of the component that were theretofore fabricated from a metal other than said first metal; bonding said insert member to the aforesaid portions of the component essentially without altering the external configuration of the component; and thereafter leaching from said component only the metal making up the carrier portion of said insert.

2. A method as defined in claim 1 wherein said insert member is bonded to said component portions by coating the faying surfaces between said insert member and said component portions with a transient liquid phase joining system and then applying to said component a pressure that is sufficiently high to effect solid state flows of the metals of which said insert member and said component portions are composed.

3. A method as defined in claim 1 wherein those surfaces of the component portions to which said insert member are bonded are essentially free of flow passage forming particularities, said particularities being furnished by one or more members as aforesaid.

* * * * *